April 6, 1926.  1,579,428
J. ZULICH
CASING FOR AUTOMOBILE LEAF SPRINGS AND THE LIKE
Filed April 17, 1925
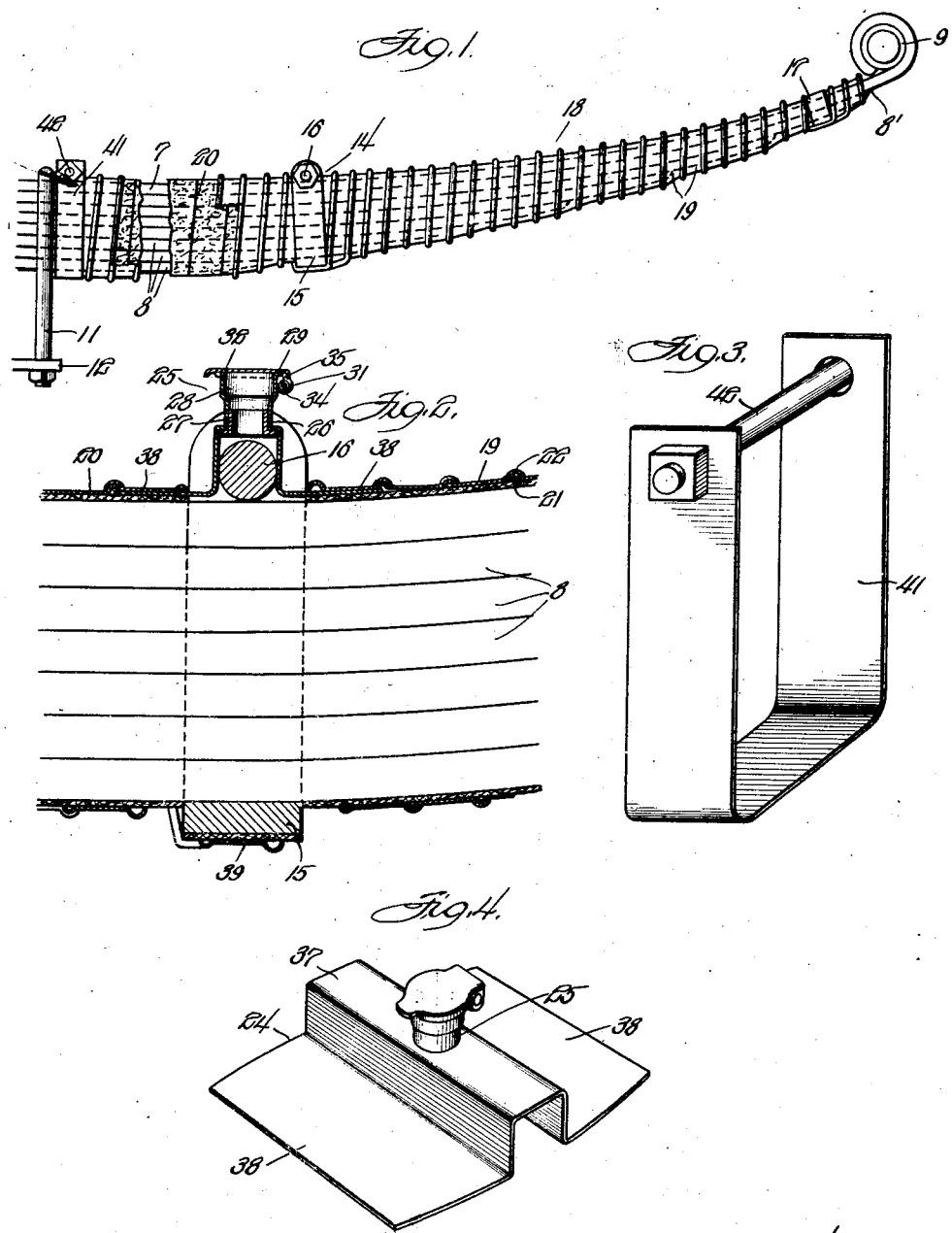
Witness:
W. T. Olson
Inventor:
John Zulich
By Williams, Bradbury,
McCaleb & Hinkle, Attys.

Patented Apr. 6, 1926.

1,579,428

UNITED STATES PATENT OFFICE.

JOHN ZULICH, OF CLEVELAND, OHIO.

CASING FOR AUTOMOBILE LEAF SPRINGS AND THE LIKE.

Application filed April 17, 1925. Serial No. 23,752.

*To all whom it may concern:*

Be it known that I, JOHN ZULICH, a citizen of the United States, and resident of Cleveland, in the county of Cuyahoga and State of Ohio, have invented a certain new and useful Improvement in Casings for Automobile Leaf Springs and the like, of which the following is a full, clear, concise, and exact description, reference being had to the accompanying drawings, forming a part of this specification.

My invention relates to casings for automobile leaf springs and the like.

The invention has particular reference to that type of leaf spring casing or cover which is constructed in the form of a metallic strip adapted to be wound spirally over the leaf spring. This general form of casing has been made the subject matter of my prior Patent No. 1,476,568, issued December 4, 1923.

One of the principal objects of the present invention is to provide an improved lubricant receptacle or fitting for conducting lubricant between the spiral casing and the spring, for lubricating the leaves of the spring. In order that the metallic strip form of casing shall have universal adaptability to all makes of cars and to different designs of springs, it is desirable that the lubricant receptacle be separate from the metallic strip. This enables the strip to be sold in roll form, and to be applied to the springs in roll form, without interference such as sometimes results from having the oil cup or fitting attached to the strip. The present form of lubricant receptacle consists of a fitting entirely separate from the strip and adapted for application to the leaf spring at any desired point.

Another object of the invention is to provide improved means which will co-operate with the spirally wound metallic strip to cover the one or more spring clips which are generally found on these leaf springs. These spring clips function to hold the several leaves of the spring together, and it is desirable that any cover or casing applied to the spring be capable of accommodating these spring clips, as their removal is likely to weaken the spring.

I attain both objects of providing an improved lubricant receiving member, and of providing a cover for the spring clip, in a single unitary fitting which is entirely separate from the metallic strip. This fitting is of comparatively simple and inexpensive construction, and is preferably of a ductile form enabling it to be shaped to adapt it to the various forms and sizes of spring clips which may be encountered on different designs of springs.

Referring to the accompanying drawing illustrating a preferred embodiment of my invention:

Figure 1 is a side elevational view of a typical automobile leaf spring showing my improved cover and fitting applied thereto;

Figure 2 is an enlarged longitudinal sectional view taken adjacent the spring clip, showing the mounting of the present fitting over the bolt of the spring clip;

Figure 3 is a perspective view of the sheet metal clamp used to secure the end of the metallic strip to the leaf spring; and Figure 4 is a perspective view of the combined spring clip cover and lubricant fitting.

In Figure 1 a typical automobile leaf spring is indicated at 7, this spring comprising a plurality of superposed leaves 8. The top leaf 8' has its end looped around the shackle bushing 9 for attachment to the shackle link of the car, each succeeding leaf below this top leaf being of shorter length for increasing the deflection strength of the spring towards its other end, as is well known in the art of leaf springs. The other end of the spring, or the central portion of the spring depending on what type of spring is employed, is secured to the axle of the car by U-shaped bolts 11 which extend across the top of the spring and pass down through a pressure plate 12 extending across the underside of the axle. This form of spring support is conventional and needs no detailed description. The several leaves of the spring are generally held against excessive separation by one or more spring clips 14 comprising a U-shaped clamping member 15, through the upper ends of which passes a bolt 16. In some instances the uppermost leaves may be joined by a clamping band 17 adjacent the shackle end of the spring.

The casing or cover 18 comprises a length of metallic strip 19 which is wound over the spring beginning with the shackle end 9 and terminating adjacent the U-shaped clamps 11 which secure the spring to the axle. Preparatory to winding this strip 19 over the spring, the spring is first encased in a fabric absorbent material adapted to absorb the lubricant and conduct it to all parts of the spring. This fabric covering preferably consists of a strip of cotton flannel 20 which is wound spirally over the spring from end to end thereof in much the same manner that the strip 19 is wound over the spring. This metallic strip 19 has beads or offset portions 21 and 22 formed along its edges which cooperate to connect the successive turns of the strip and to close the casing against the ingress of dirt or the egress of oil. The bead or offset portion 21 is preferably of small diameter or projecting dimension, this smaller bead being formed along the leading edge of the strip, i. e., the edge adjacent the large end of the spring. The other bead or indentation 22 is of sufficiently larger diameter to engage over the bead 21 and lock the successive convolutions against lateral separation. The bead 22 may, if desired, be made with its internal diameter sufficiently larger than the external diameter of the small bead to allow a limited lateral movement between successive convolutions for the purpose of accommodating the flexure of the spring leaves 8. All of this has been set forth at length in my above mentioned prior Patent No. 1,476,568.

There is no material difficulty in passing the metallic strip 19 over a clip of the type illustrated at 17 because there are no bolts or other projecting parts on this type of spring clip which will interfere with the metallic strip, but in passing the strip over a spring clip, such as indicated at 14, some difficulty is experienced in effectively closing the casing at this point. Most of this difficulty occurs across the top and along the sides of the bolt 16, where it is difficult to pass the strip in such manner that the spring leaves are covered at this point against the entrance of water and dirt or the egress of oil. I have overcome this difficulty by employing a fitting of the general construction illustrated in Figure 4 for covering the bolt 16 and for providing an entrance way for the injection of lubricant between the casing and the spring. This fitting comprises a plate 24 of aluminum or other ductile metal, and an oil cup or other lubricant receptacle 25 secured to the central portion of this plate. One simple form of cup 25 is illustrated in section in Figure 2. The lower end of the cup is of reduced diameter as indicated at 26 for receiving the neck of the flanged bushing 27 by which the cup is secured to the plate 24. The bushing 27 is extended up through an aperture in the plate, the flange of the bushing engaging the underside of the plate around this aperture, and the neck portion of the bushing being screwed or driven into the reduced lower end 26 of the cup. The enlarged upper end 28 of the cup has a lip of metal 29 punched backwardly, from the ends of which depend two spaced pivot lugs 31. The cap 32 has depending pivot lugs which co-operate with the pivot lugs 31, a pivot pin 34 being passed through aligned apertures in both pairs of pivot lugs. A coil spring 35 wound about this pivot pin 34 normally tends to hold the cap 32 in closed position.

As supplied to the dealer or garage owner, the metallic strip 19 is coiled in a compact roll and the lubricant fitting has its plate portion 24 flat so that both are relatively compact. In adapting the lubricant fitting to the spring clip 14, the central part of the plate is humped or arched to form the transverse channel portion 37 for snugly engaging over the bolt 16 of the spring clip. This channel portion 37 can be made of any desired depth by the proper shaping of the ductile plate 24. The laterally extending portions 38 are then turned outwardly from the channel portion 37 to lie flat on the top of the leaf spring. Thereafter, the metallic strip is wound spirally over the spring, preferably starting at the small end of the spring as above stated, and locking the bead 22 over the bead 21 of each preceding convolution. When the spring clip 14 is encountered, the metallic strip is wound over the laterally extending portions 38 to secure the lubricant fitting to the spring and make it a part of the casing 18. In passing the metallic strip from one side to the other of the spring clip, the strip is preferably passed across the under part of the clip as indicated at 39 in Figure 2.

When the U-shaped clamping bolt 11 is reached, any remaining portion of the metallic strip is cut off and a U-shaped clamp 41 is engaged over this end of the strip as indicated in Figure 1. This clamp 41 comprises a U-shaped strip of ductile metal having its ends apertured for receiving a transverse bolt 42. The ductile form of the clamp 41 enables it to be shaped to springs of different dimensions, and when drawn over the end of the metallic strip 19 by the bolt 42 it will securely hold this end of the metallic strip against unwinding.

It will be evident that lubricant injected through the cup 25 will have ready access around the bolt 16 to the fabric absorbent material 20. This lubricant, preferably oil, will permeate through this absorbent material and be conducted by capillary attraction to the ends of the leaf spring and around all sides thereof.

Having thus described my invention, what I claim is:

1. A fitting for engaging over the spring clip of an automobile leaf spring in association with a spring casing of the class described, comprising a soft metal plate adapted to have its intermediate portion arched over the bolt of said spring clip and having the laterally extending portions engaging with the leaf spring to each side of said bolt, a lubricant cup, a flanged bushing mounted in an aperture in said plate and engaging in said lubricant cup, a lip turned back from one edge of said lubricant cup, pivot lugs depending from said lip, a cap having pivot lugs depending therefrom, a pivot pin extending through said pivot lugs, and a spring operating to close said cap.

2. The combination with a leaf spring having a U-shaped spring clip secured thereto by a bolt passing between the ends of said clip, of a ductile metal plate having a high arched portion extending transversely thereof for fitting down over said bolt, said arched portion being of a width substantially equal to that of the spring for substantially covering the width of said spring between the ends of said clip, said plate comprising laterally extending portions adapted to lie substantially flat on the spring on each side of said bolt, a lubricant receptacle carried on said arched portion, and a flexible metallic strip wound around said spring with its convolutions passing over the laterally extending portions of said plate and serving to secure said plate to the spring, the edges of said strip having beads thereon whereby inter-engagement of successive convolutions is obtained through the engagement of said beads.

3. The combination with a leaf spring having a U-shaped spring clip secured thereto by a bolt passing between the ends of said clip, of a fitting for covering said bolt and the adjacent portions of said spring consisting of a single strip of ductile sheet metal of a width substantially equal to the width of the spring and having a narrow central portion arched sufficiently high to clear the bolt of said spring clip and fitting over said bolt, and a flexible metallic strip wound around said leaf spring with its convolutions passing over the laterally extending portions of said fitting and serving to secure said fitting to the spring.

4. The combination of a leaf spring having a U-shaped spring clip secured thereto by a bolt passing between the ends of said clip, a fitting for covering said bolt and the adjacent portions of said leaf spring consisting of a single strip of sheet metal of a width substantially equal to the width of the leaf spring and having a narrow central portion arched sufficiently high to clear the bolt of said spring clip and fitting over said bolt, said sheet metal strip being of sufficient ductility to permit shaping before application over said bolt, a lubricant receptacle carried by the arched portion of said fitting, and a flexible metallic strip having beaded edges locking successive convolutions, and with its convolutions passing over the laterally extending portions of said fitting and serving to secure the latter to the spring.

5. The combination with a leaf spring having a U-shaped spring clip secured thereto by a bolt passing between the ends of said clip, of a ductile metal plate having a high arched portion extending transversely thereof for fitting down over said bolt, said arched portion having an aperture therein, a bushing passing up through said aperture and having a flange at its lower end engaging against the under side of said arched portion, a lubricant receptacle secured to the projecting upper end of said bushing, and a flexible metallic strip wound around said spring with its convolutions passing over the laterally extending portions of said plate and serving to secure said plate to the spring.

In witness whereof, I hereunto subscribe my name this 23 day of March, 1925.

JOHN ZULICH.